United States Patent

[11] 3,627,266

[72] Inventor Willy Braun
 Friedrich-Ebert-Strasse 47, Heiligenrode, Germany
[21] Appl. No. 839,018
[22] Filed July 3, 1969
[45] Patented Dec. 14, 1971
[32] Priority July 3, 1968
[33] Germany
[31] P 17 03 729.5

[54] APPARATUS FOR PULLING TOGETHER FREE ENDS OF AN ENDLESS TRACK OR BAND
15 Claims, 6 Drawing Figs.

[52] U.S. Cl. .................................................. 254/53
[51] Int. Cl. .................................................. F16g 11/12
[50] Field of Search .......................................... 254/51, 52, 53, 79

[56] References Cited
UNITED STATES PATENTS
224,378  2/1880  Baughman..................... 254/53

Primary Examiner—Andrew R. Juhasz
Assistant Examiner—David R. Melton
Attorney—Krafft & Wells ABSTRACT: An apparatus for pulling together the free ends of an endless track or band for coupling the ends together, comprising a tensioning device for mounting on one free end of the endless track, a flexible connecting member extending from the device and a coupling connecting the member and the other free end of the endless track.

PATENTED DEC 14 1971 3,627,266
SHEET 1 OF 4
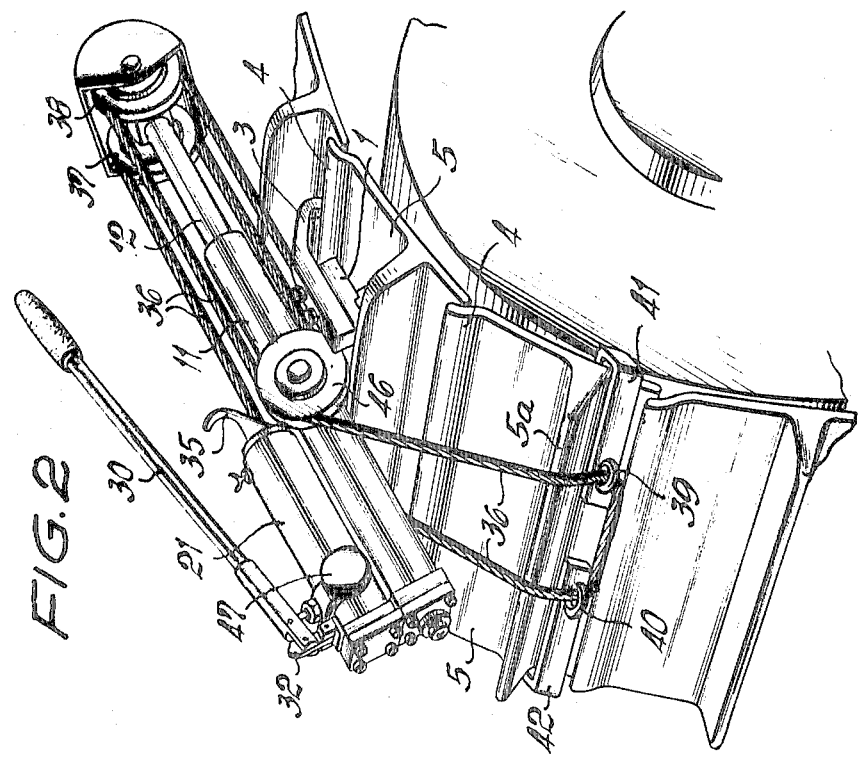
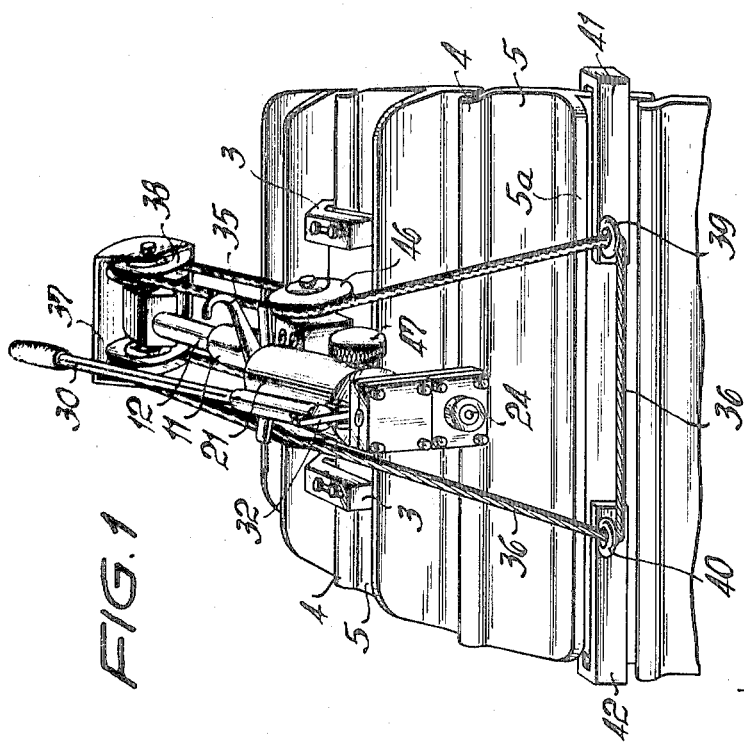
INVENTOR
Willy BRAUN
BY
Krafft & Wells
his ATTORNEYS

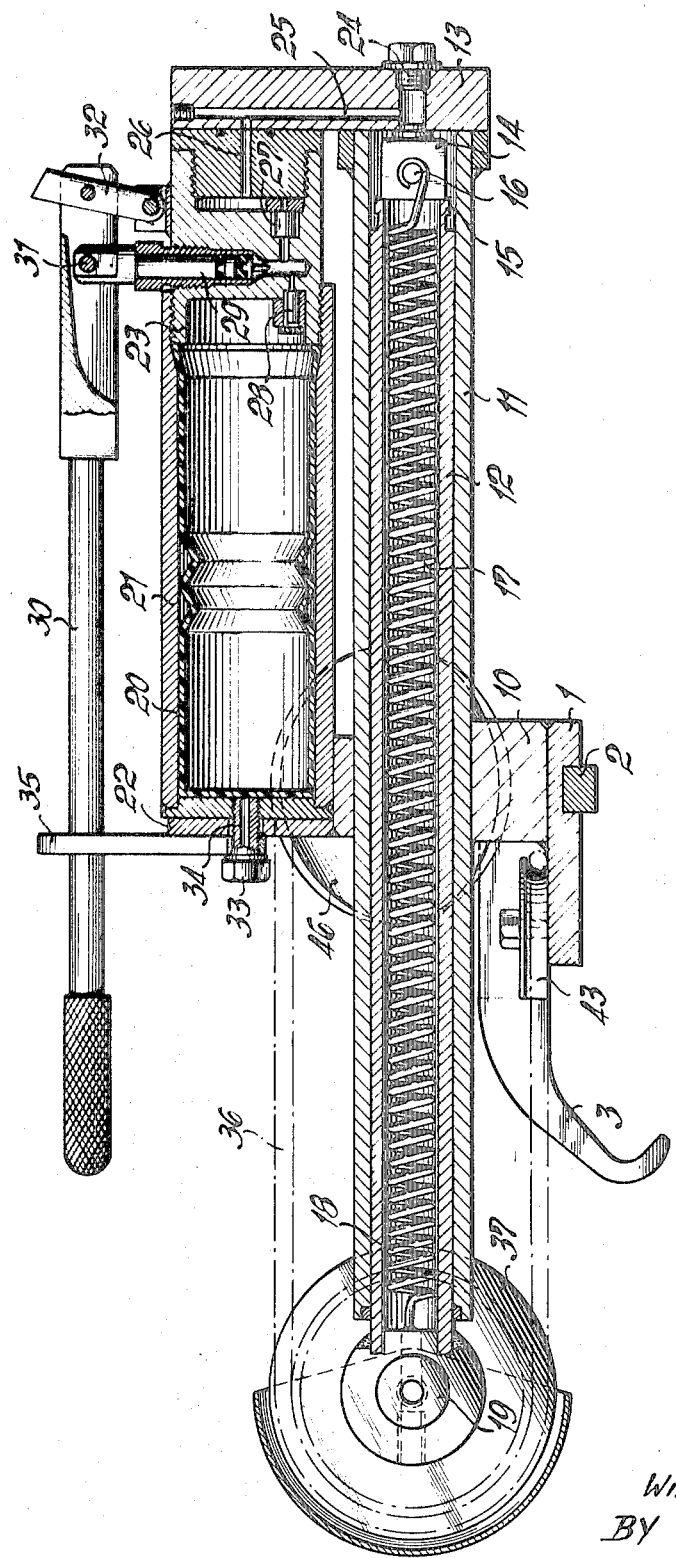

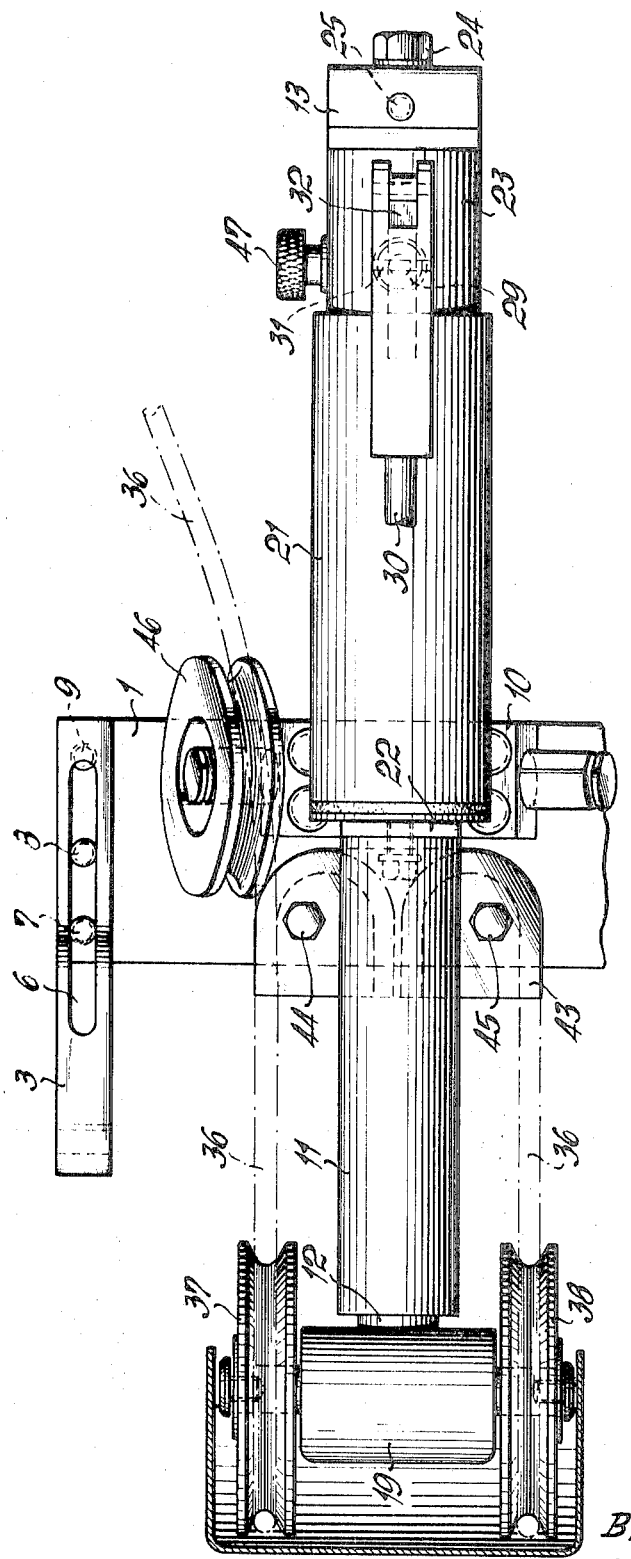

INVENTOR
Willy BRAUN
BY
Krafft & Wells
his ATTORNEYS

APPARATUS FOR PULLING TOGETHER FREE ENDS OF AN ENDLESS TRACK OR BAND

CROSS-REFERENCE TO RELATED APPLICATION

Applicant claims priority under 35 U.S.C. 119 for application Ser. No. P 17 03 729.5, filed July 3, 1969 in the Patent Office of the Federal Republic of Germany.

The invention relates to a device for pulling together the free ends of an endless track or band so that the same can be coupled together to close the endless track or band.

Devices of this kind used e.g. to close endless tracks such as "Caterpillar"tracks of an endless track vehicle are known. In such devices, to close the endless tracks, the end links of the track are pulled together, then interconnected by a fastening element. For instance, once the eyes of the end links of a "Caterpillar" track have been positioned in concentric registration with one another, a pin is driven through the eyes to interconnect the two end links.

This invention has for an object to provide a device having the advantage of enabling the ends of an endless track or band, e.g. a "Caterpillar" track, to be pulled together mechanically as far as the position for closure, thus facilitating ready and accurate closure.

According to the invention, one free end of the endless track or band e.g., an end link of a "Caterpillar" track, has secured to it a device from which a flexible pull-type connecting member, e.g. in the form of a rope or a chain, extends, such member being guided on retaining means disposed on the other free end and sliding along such means and back to the tensioning device. When the device is operated, the pull which the tensioning device applies to the flexible connecting member pulls the two free ends of the endless track or band together until such ends reach the position for closure.

Conveniently, the two ends of the endless flexible connecting member, e.g. of a steel rope, are, in the device according to the invention, secured to a baseplate of the tensioning mechanism by being guided around a deflecting pulley and then around a further pulley to attaching means on the baseplate. Conveniently, the length of the flexible connecting member is sufficient to permit the same to be adjusted to suit requirements. One or both of the connecting-member ends secured to the baseplate can be extended beyond the baseplate attaching means so as to form a reserve part of the connecting member, allowance being made for such part by adjustment.

Conveniently, the baseplate has interchangeable projections engageable with abutments on the endless track or band e.g. the transverse bar or bars of a "Carterpillar" track. Advantageously, the baseplate has hooks or other means which are secured to and engageable with a part of the endless track or band the hooks or means preventing the tensioning device from tilting when the same is operated even when subjected to a considerable pull.

The tensioning device can be power operated for example by an electric motor through suitable reduction gearing. Alternatively the same can be operated by fluid pressure means which can be power operated or operated manually. For example the device can be operated hydraulically, the tensioning device being provided with a hydraulic cylinder having a pressure relief valve; and that element of the cylinder which acts as a piston rod is biased by a spring which, after the pulling-together and closure of the free ends of the endless track e.g. the end links of a "Caterpillar" track, and after the opening of the pressure relief valve, automatically brings the piston rod element to the initial position. With this arrangement, the cylinder can be supplied from a fully enclosed reservoir which includes a flexible container for example a plastics bag which will adapt itself resiliently and without vacuum to the quantity of oil present in it. The pressure liquid can be supplied by a pump, manually operated. Alternatively, the pressure-oil-operated tensioning device can be connected to a motor drive, e.g. an electric motor through appropriate reduction gearing.

When the tensioning device is operated, the flexible connecting member, such as a steel rope, which is disposed between the tensioning device and the other end of the endless track or band, shortens until the free ends of the track or band meet in the position for closure, so that the connecting pin or other connecting element can be assembled to secure the free ends together. In this arrangement, the two ends of the endless flexible connecting member, e.g. of a steel rope, are secured to the baseplate of the tensioning device, one end being guided around a deflecting pulley and then around a further pulley to its mounting on the baseplate. Conveniently, one or both of the flexible connecting-member ends secured to the baseplate can be extended beyond the baseplate mounting to provide a reserve length permitting adjustment to suit requirements.

Conveniently, the baseplate has interchangeable projection engaging between adjacent abutments of the endless track or band. Also, the baseplate has hooks or the like which are secured to it and which prevent the tensioning device from tilting in response even to considerable pulls on it.

In this arrangement, so that the tensioning device may produce a progressive shortening of that part of the length of the flexible connecting member which is disposed between the tensioning device and the opposite free end of the endless track or band, such free end has releasably secured to it guide means, more particularly two eyes, hooks or the like which are disposed on both sides of the free end and through which the flexible connecting member extends slidingly.

The guide means can take the form e.g. of two hooks which have eyes and which are mounted on a track or band, for instance, by extending therearound and engaging with a transverse rib hereof.

When hydraulically operated, to slacken and remove the device after the free ends of the track or band have been closed, a valve disposed in a bypass for the nonreturn valves can be opened so permitting the spring which biases the piston rod to contract and, in so doing, move the cylinder with it so that oil returns to the reservoir.

The device can also be used to assist the separation of the coupled ends of an endless track or band. Frequently, as a result of prolonged stressing the pin or other means interconnecting the ends of the endless track or band often becomes so deformed that it cannot be removed just by being driven out axially. In such cases, the device is assembled in the manner above disclosed the tensioning device being connected to the connected ends of the endless track or band, whereafter the device is operated to pull the connected ends together to align the connected ends of the track or band which have become misaligned due to deformation of the pin or other connecting means whereafter the distorted pin or other connecting means can be removed.

An embodiment of the invention will now be described by way of example with reference to the accompanying drawings wherein:

FIG. 1 is a diagrammatic perspective view of the device according to the invention as fitted to the "Caterpillar" track of an endless track vehicle;

FIG. 2 shows the same device as shown in FIG. 1 but as seen from the right side of FIG. 1, FIG. 3 is a view in side elevation and partly longitudinal section of the device according to the invention;

FIG. 4 is a plan view of the device shown in FIG. 3;

Figure 5:
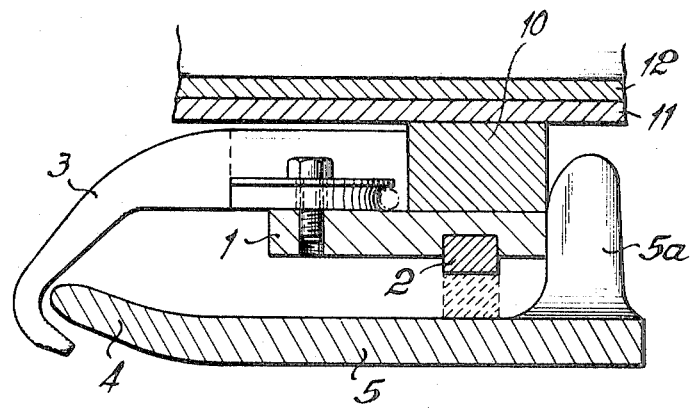
FIG. 5 is a view from the side and in detail of a securing means for the device.
Figure 6:
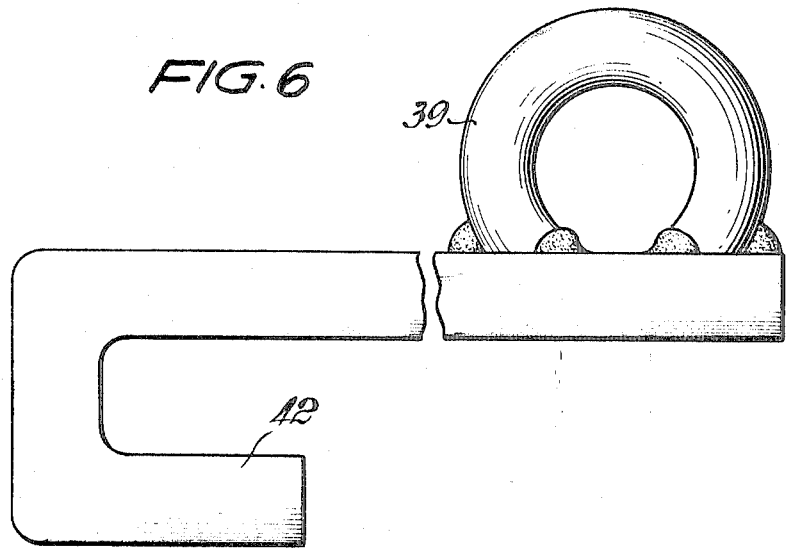
FIG. 6 is a view from the side of retaining means serving to guide the flexible connecting means.

Referring to the drawings, the tensioning device consists of a baseplate 1 having one or more transversely extending bars 2 each of which is disposed in a slot in the under surface of the baseplate 1 so as partially to project outwardly therefrom. The baseplate 1 also has a pair of hooks 3. Each hook has a lengthwise extending slot 6 the hooks being disposed with the hooked end projecting outwardly over the edge of the baseplate remote from the bar 2 each hook being secured to the baseplate 1 by bolts 7, 8 the position of the hooked ends of the hooks being thus adjustable in relation to the baseplate 1 by the slots 6.

In the present embodiment the device is operated hydraulically. The hydraulically operated means comprises a hydraulic ram consisting of an outer cylinder 11 and an inner cylinder 12 slidable therein. The cylinder 12 is supported on a bracket 10 carried by baseplate 1. At its right-hand end (FIG. 3), cylinder 11 is closed by an end plate 13. An anchor member 14 is disposed in the cylinder 11 between the inner end of the cylinder 12 and the end plate 13. The anchor member 14 bears against an annular collar 15 rigidly mounted on the inner wall of cylinder 11. A spiral spring 17 extends through the inner cylinder 12 and one end the spiral spring 17 is secured to a pin 16 of anchor member 14, the other end 18 of the spring 17 extending through a block 19 attached to the outer end of inner cylinder 12 and is secured e.g. by a screw-threaded fastening. The action of the spring 17 is to pull the cylinder 12 into cylinder 11 to its retracted position when hydraulic pressure in cylinder 11 is released the hydraulic pressure acting on the inner end of cylinder 12 displacing cylinder 12 outwardly of cylinder 11 against the action of the spring.

Disposed above cylinder 11 is a hydraulic reservoir and pumping means for supplying the pressure medium from the reservoir to the cylinder 11. As shown in FIGS. 3 and 4, the reservoir consists of a resilient bellows 20 which contain the pressure medium, e.g. oil, and which are made from a material, such as oil-resistant plastics, inert to the pressure medium. Bellows 20 are enclosed in a metal pressure cylinder 21 which is closed at one end by a cover 22. At its other end the metal cylinder 21 is closed by a pump block 23 which is in turn supported by the end plate 13. The cylinder 21 is screwed or otherwise detachably secured to the pump block.

Pump block 23 contains a piston pump the piston 29 of the pump being slidable in a pump bore in the pump block. The pump block also contains two nonreturn valves 27 and 28. The valves 27 and 28 are disposed at the inner end of the pump bore, the valve 28 being between the pump bore and the interior of the reservoir bellows 20, the valve 27 being between the pump bore and a passage 26 in the pump block the passage 26 being in communication with the interior of outer cylinder 11 through further passages 25 and 25a in the end plate 13. A screwed plug 24 closes the outer end of passage 25a. The piston 29 of the piston pump is manually operable by a hand lever 30 one end of which is pivotally connected to a link 32 which is in turn pivotally mounted on a boss carried by the pump block 23. The hand lever 30 is also pivotally connected by pivot pin 31 to the outer end of piston 29. A catch 35 rotatable on a stud 33 screwed into cover 22 holds lever 30 in a nonoperative position, the catch being turned out of the retaining position when the pump is to be operated. A drilling 34 extends axially through stud 33 and opens the interior of the metal cylinder 21 to atmosphere so that the resilient bellows 20 can adapt itself to its contents as it empties thus avoiding the creation of negative pressure or vacuum in the reservoir.

The block 19 attached to the outer end of inner cylinder 12 has a shaft 19a extending therethrough. The shaft carries a pair of grooved pulleys, a pulley 37 at one end and a pulley 38 at the opposite end. A pair of grooved guide pulleys are carried by the bracket 10. The guide pulleys shown at 46 are disposed one on either end of the bracket 10 each guide pulley being freely rotatable on a stud shaft 46a projecting outwardly and upwardly at an angle from the bracket. A steel wire rope or other flexible pull-type connecting member 36 passes around the pulleys 37, 38 and guide pulleys 46 two free ends of the rope 36 being anchored to the baseplate 1, the rope 36 being threaded through means attachable to the endless track or band. The two ends of the rope 36 are secured to the baseplate 1 by clamping plates 43 each of which is screwed down by a bolt 44 or 45 to clamp the rope ends between the clamping plates and the base 1. From the clamped ends the rope 36 passes around each groove pulley 37 and 38 and over each guide pulley 46 the looped end being threaded through two eyes 39, 40, the eye 39 being provided in an attaching member 41 having a hooked end the eye 40 being provided on a similar attaching member 42 also having a hooked end.

In the drawings the device of the invention is shown in use for pulling together the disconnected ends of an endless track of the kind known as "Caterpillar" track, such tracks consisting of a plurality of interconnected plates 5 each having at least one transverse ground engaging rib 5a extending across the width of a plate and towards one transverse edge thereof, the free ends of the track each having pairs of lugs the lugs having holes to receive a securing pin when the track ends are pulled together so that the lugs overlap one another and the holes therein are in register.

Referring to FIGS. 1 and 2 of the drawings the track plates 5 each have a single ground-engaging rib 5a and the device is mounted in position with the cylinder 11 extending in the lengthwise direction of the track. The baseplate 1 extends across the width of the track plate 5 adjacent one of the free ends of the track the bar 2 abutting against the rib 5a, the hooks 3 are each engaged with the transverse edge of the plate 5 the hooks being if necessary adjusted in their lengthwise direction as permitted by the slots 6. The hooked attaching members 41 and 42 are then engaged behind the rib 5a of one of the plates 5 at or spaced from the other free end of the track, the members extending transversely of the plate with the hooked end of each member embracing the plate edge as shown clearly in FIG. 2. When the device is mounted as described, the catch 35 is released so that lever 30 can be operated to actuate the pump and supply hydraulic liquid from the reservoir 20 through valves 28 and 27, passages 26, 25 and 25a to the interior of cylinder 11. The inner cylinder 12 is therefore displaced outwardly and spring 17 tensioned. The outward movement of the inner cylinder 12 exerts a pull on the rope 36 so that the disconnected ends of the track are pulled together. When the holes in the plate lugs are in alignment pumping is stopped and a retaining pin inserted through the aligned holes of the lugs to couple the track ends together and close the endless track.

To remove the device, a relief valve (not shown) operable by a control member 47 on the pump block is opened so that the interior of outer cylinder 11 is connected through a bypass passage (also not shown) to the reservoir, the opening of the relief valve permitting the spring 17 to pull the inner cylinder 12 into the outer cylinder 11 to return the former cylinder to the retracted position, the hydraulic liquid being discharged as the cylinder 12 moves inwardly through the passages 25a, 25 and 26 and the passage which bypasses the nonreturn valves.

Since the hooks 3 are adjustable, the device described can readily be used for caterpillar tracks of a variety of tread sizes. Because of the endless pull rope feature between the screws 44 and 45, the pull rope can readily be adapted to any distance between the track end bars. Ropes of various lengths can readily be used for this purpose, and a surplus rope end can extend beyond one of the mounting places, so that the rope can be shortened or lengthened to suit requirements.

When the tensioning device is anchored to a one-web tread, as is shown in FIG. 5, the function of the bar 2 is to act as a spacer between the tread surface and the power-operated section of the device. The bar 2 is anyway of a size and design such that the power-operated portion of the tensioning device can be guided beyond the particular web concerned of the tread, for instance, of a single-web tread.

The hooks 3 serve to prevent the baseplate 1 and the tensioning device thereon from tilting, the device can readily be suspended on the caterpillar track and the tension-receiving parts of the device brought to their correct position. The hooks 3 as above mentioned can be provided with a slot 6 through which screws extend; the screws cooperate with appropriate apertures 7, 8 visible in FIG. 4. A third screw hole 9 can be seen in FIG. 4; a screw is introducible thereinto when the hook 3 is shifted to the right. In any case the front edge of baseplate 1 takes all the tension evolved by the tensioning device by bearing on rib 5a of plate 5.

Pressure medium can be charged into the reservoir 20 after cylinder 21 has been unscrewed from the pump block 23; the reservoir 20 can be topped up, after removal of the plug 24 and unscrewing of an oil supply pipe, via ducts 25, 26.

I claim:

1. An apparatus for pulling together the free ends of an endless track or band so that the same can be coupled together to close the endless track or band comprising a tensioning device having a baseplate adapted for mounting on one free end of the endless track or band and pulley means displaceable away from said baseplate, a flexible connecting member extending over said pulley means and away from said device, means couple to said connecting member and engageable with the other free end of the endless track or band, actuation of the device resulting in a pull on the flexible connecting member, whereby the free ends of the track or band are pulled together to the position for closure.

2. The apparatus as claimed in claim 1, wherein said pulley means is displaceable by hydraulic pressure.

3. The apparatus as claimed in claim 1, wherein said baseplate has a pressure-oil-operated cylinder having a piston biased by a spring to a retracted position mounted thereon and said pulley means is displaced by the extension of the piston by the admission of pressurized oil to the cylinder actuating the device to pull the track or band ends together, the spring action returning the piston to the retracted position when the oil pressure is released.

4. The apparatus as claimed in claim 3, including a relief valve on said cylinder operable to permit discharge of the pressure liquid from said cylinder.

5. The apparatus as claimed in claim 4, wherein said cylinder is connected to a fully enclosed reservoir consisting of a resilient bag which adapts itself resiliently and without vacuum to the quantity of oil present in it.

6. The apparatus as claimed in claim 5, including a pump for supplying oil to the cylinder.

7. The apparatus as claimed in claim 6, wherein said pump is power driven.

8. The apparatus as claimed in claim 1, wherein said endless flexible connecting member has two ends secured to said baseplate of the tensioning device, said flexible member passing around said pulley means on the device.

9. The apparatus as claimed in claim 1, wherein said flexible connecting member has a length sufficient to permit adjustment thereof.

10. The apparatus as claimed in claim 8, characterized in that the baseplate has interchangeable projections or bars engageable with abutments on or adjacent the free ends of the endless track or band.

11. The apparatus as set forth in claim 8, characterized in that the baseplate has hooks or the like which are secured to it and engageable with a part of the endless track or band and which prevent the tensioning device from tilting during use.

12. The apparatus as claimed in claim 1, characterized in the flexible connecting member is guided, on one of the free end near the tensioning device, by guide means releasably connected to such free end and taking the form more particularly of two attaching members engageable one on either side of one free end of the endless track or band.

13. The apparatus as claimed in claim 12, characterized in that the guide means for the flexible connecting member comprise two hooks which have eyes through each of which the flexible connecting member is threaded.

14. The apparatus as claimed in claim 8, characterized in that the two ends of the flexible connecting member are secured to the baseplate by clamping plates disposed thereon.

15. The apparatus as claimed in claim 13, characterized in that the flexible connecting member from one end goes first over a pulley, then over an inclined guide pulley, then through the eyes of the attaching members and then returns over a further guide pulley and second pulley and finally to a further clamping plate.

* * * * *